US011443518B2

(12) United States Patent
Cui et al.

(10) Patent No.: US 11,443,518 B2
(45) Date of Patent: Sep. 13, 2022

(54) UNCREWED AERIAL VEHICLE SHARED ENVIRONMENT PRIVACY AND SECURITY

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Sameena Khan, Peachtree Corners, GA (US); Troy Paige, Buford, GA (US); Ari Craine, Marietta, GA (US); Robert Koch, Peachtree Corners, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/107,736

(22) Filed: Nov. 30, 2020

(65) Prior Publication Data
US 2022/0171973 A1    Jun. 2, 2022

(51) Int. Cl.
*G06V 20/52*    (2022.01)
*G06T 7/50*    (2017.01)
(Continued)

(52) U.S. Cl.
CPC ............ *G06V 20/52* (2022.01); *B64C 39/024* (2013.01); *B64D 47/08* (2013.01); *G01S 19/485* (2020.05); *G06T 5/005* (2013.01); *G06T 7/13* (2017.01); *G06T 7/50* (2017.01); *G06T 7/73* (2017.01); *G06V 20/176* (2022.01); *H04N 5/23218* (2018.08); *H04N 7/185* (2013.01); *B64C 2201/027* (2013.01); *B64C 2201/127* (2013.01);

(Continued)

(58) Field of Classification Search
None
See application file for complete search history.

(56) References Cited

U.S. PATENT DOCUMENTS 5,295,551 A    3/1994 Sukonick
5,636,123 A    6/1997 Rich et al.
(Continued)

FOREIGN PATENT DOCUMENTS

CN    105278759 B    1/2016
CN    107945103 A    4/2018
(Continued)

OTHER PUBLICATIONS

Mueller, et al., "Jogging with a Quadcopter", CHI 2015, Apr. 18, 2015, exertiongameslab.org, downloaded from http://exertiongameslab.org/wp-content/uploads/2011/07/quadcopter_chi2015.pdf, 10 pages.
(Continued)

*Primary Examiner* — Eileen M Adams

(57) ABSTRACT

A processing system including at least one processor may capture at least one image via at least one imaging sensor of an uncrewed aerial vehicle in a shared environment, detect a window within the at least one image, determine a location of the window in the shared environment, based upon a position of the uncrewed aerial vehicle and a distance between the uncrewed aerial vehicle and at least a portion of the window that is calculated from the at least one image, and record the location of the window in a map of the shared environment as a prohibited imaging zone.

20 Claims, 5 Drawing Sheets

(51) Int. Cl.

| | |
|---|---|
| *G06T 7/13* | (2017.01) |
| *H04N 7/18* | (2006.01) |
| *G06T 5/00* | (2006.01) |
| *H04N 5/232* | (2006.01) |
| *B64C 39/02* | (2006.01) |
| *B64D 47/08* | (2006.01) |
| *G01S 19/48* | (2010.01) |
| *G06T 7/73* | (2017.01) |
| *G06V 20/10* | (2022.01) |
| *G01S 17/89* | (2020.01) |

(52) U.S. Cl.
CPC ..... *G01S 17/89* (2013.01); *G06T 2207/10032* (2013.01); *G06T 2207/20081* (2013.01); *G06T 2207/30232* (2013.01); *H04N 5/23299* (2018.08)

(56) References Cited

U.S. PATENT DOCUMENTS

| | | |
|---|---|---|
| 7,415,331 B2 | 8/2008 | Dapp et al. |
| 7,451,023 B2 | 11/2008 | Appleby et al. |
| 7,737,878 B2 | 6/2010 | Van Tooren et al. |
| 8,914,182 B2 | 12/2014 | Casado et al. |
| 8,948,935 B1 | 2/2015 | Peeters et al. |
| 9,169,030 B2 | 10/2015 | Wong et al. |
| 9,317,034 B2 | 4/2016 | Hoffman et al. |
| 9,405,181 B2 | 8/2016 | Wong et al. |
| 9,464,907 B1 | 10/2016 | Hoareau et al. |
| 9,523,986 B1 | 12/2016 | Abebe et al. |
| 9,567,077 B2 | 2/2017 | Mullan et al. |
| 9,691,285 B2 | 6/2017 | Jarrell |
| 9,713,675 B2 | 7/2017 | Levien et al. |
| 9,720,519 B2 | 8/2017 | Verma |
| 9,754,496 B2 | 9/2017 | Chan et al. |
| 9,760,087 B2 | 9/2017 | Hoareau et al. |
| 9,798,329 B2 | 10/2017 | Shattil |
| 9,835,709 B2 | 12/2017 | Tran et al. |
| 9,848,459 B2 | 12/2017 | Darrow et al. |
| 9,854,206 B1 | 12/2017 | Ren et al. |
| 9,861,075 B2 | 1/2018 | Shen et al. |
| 9,896,202 B2 | 2/2018 | Jourdan |
| 9,940,525 B2 | 4/2018 | Wolf |
| 9,943,965 B2 | 4/2018 | Moore |
| 9,977,428 B2 | 5/2018 | Hall |
| 9,984,579 B1 | 5/2018 | Harris et al. |
| 9,986,378 B2 | 5/2018 | Jones |
| 10,050,760 B2 | 8/2018 | Ross et al. |
| 10,073,336 B2 | 9/2018 | Maes et al. |
| 10,155,166 B1 | 12/2018 | Taylor et al. |
| 10,159,218 B2 | 12/2018 | Shen et al. |
| 10,203,701 B2 | 2/2019 | Kurdi et al. |
| 10,254,766 B2 | 4/2019 | High et al. |
| 10,269,257 B1 | 4/2019 | Gohl et al. |
| 10,274,952 B2 | 4/2019 | Cantrell et al. |
| 10,308,430 B1 | 6/2019 | Brady et al. |
| 10,313,638 B1 | 6/2019 | Yeturu et al. |
| 10,325,506 B2 | 6/2019 | Goddemeier et al. |
| 10,331,124 B2 | 6/2019 | Ferguson et al. |
| 10,332,394 B2 | 6/2019 | Gomez Gutierrez et al. |
| 10,354,537 B2 | 7/2019 | Beaurepaire et al. |
| 10,372,122 B2 | 8/2019 | Zach |
| 10,440,229 B2 | 10/2019 | Drako |
| 10,441,020 B1 | 10/2019 | Andon et al. |
| 10,453,345 B2 | 10/2019 | Greenberger et al. |
| 10,467,885 B2 | 11/2019 | Trundle et al. |
| 10,481,600 B2 | 11/2019 | Yen et al. |
| 10,501,180 B2 | 12/2019 | Yu |
| 10,565,395 B2 | 2/2020 | Matusek et al. |
| 10,586,464 B2 | 3/2020 | Dupray et al. |
| 10,600,326 B2 | 3/2020 | Kim et al. |
| 10,607,462 B2 | 3/2020 | Drake |
| 10,636,297 B2 | 4/2020 | Wang et al. |
| 10,643,406 B2 | 5/2020 | Arya et al. |
| 10,654,482 B2 | 5/2020 | Urano et al. |
| 10,655,968 B2 | 5/2020 | Rezvani |
| 10,672,278 B2 | 6/2020 | Deluca et al. |
| 10,676,022 B2 | 6/2020 | Zevenbergen et al. |
| 10,683,088 B2 | 6/2020 | Erickson et al. |
| 10,706,634 B1 | 7/2020 | Baumbach et al. |
| 10,748,429 B2 | 8/2020 | Bosworth |
| 10,761,544 B2 | 9/2020 | Anderson et al. |
| 10,762,795 B2 | 9/2020 | Contreras et al. |
| 10,762,797 B2 | 9/2020 | Navot et al. |
| 10,765,378 B2 | 9/2020 | Hall et al. |
| 10,818,187 B2 | 10/2020 | Perko |
| 2005/0259150 A1 | 11/2005 | Furumi et al. |
| 2007/0288132 A1 | 12/2007 | Lam |
| 2015/0202770 A1 | 7/2015 | Patron et al. |
| 2015/0269258 A1 | 9/2015 | Hunt, Jr. |
| 2015/0350614 A1 | 12/2015 | Meier et al. |
| 2016/0214717 A1 | 7/2016 | De Silva |
| 2016/0246297 A1 | 8/2016 | Song |
| 2016/0373699 A1 | 12/2016 | Torres et al. |
| 2017/0081026 A1 | 3/2017 | Winn et al. |
| 2017/0278409 A1 | 9/2017 | Johnson et al. |
| 2017/0291608 A1 | 10/2017 | Engel et al. |
| 2017/0368413 A1 | 12/2017 | Shavit |
| 2018/0035606 A1 | 2/2018 | Burdoucci |
| 2018/0072416 A1 | 3/2018 | Cantrell et al. |
| 2018/0136659 A1 | 5/2018 | Matloff |
| 2018/0162504 A1 | 6/2018 | Lindsø |
| 2018/0204469 A1* | 7/2018 | Moster ................. G08G 5/0039 |
| 2018/0232580 A1 | 8/2018 | Wolf |
| 2018/0259960 A1 | 9/2018 | Cuban et al. |
| 2018/0275659 A1* | 9/2018 | Ono ..................... B64C 39/024 |
| 2018/0308130 A1 | 10/2018 | Hafeez et al. |
| 2019/0035128 A1 | 1/2019 | Russell |
| 2019/0051224 A1 | 2/2019 | Marshall et al. |
| 2019/0052852 A1 | 2/2019 | Schick et al. |
| 2019/0061942 A1 | 2/2019 | Miller |
| 2019/0112048 A1 | 4/2019 | Culver |
| 2019/0135450 A1 | 5/2019 | Zhou et al. |
| 2019/0185158 A1 | 6/2019 | Blake et al. |
| 2019/0197254 A1* | 6/2019 | Salgar .................... H04N 7/185 |
| 2019/0220002 A1* | 7/2019 | Huang ................... G01B 11/22 |
| 2019/0227557 A1 | 7/2019 | Kim et al. |
| 2019/0238338 A1 | 8/2019 | Obrien et al. |
| 2019/0324456 A1 | 10/2019 | Ryan et al. |
| 2019/0339712 A1 | 11/2019 | Williams et al. |
| 2019/0369641 A1 | 12/2019 | Gillett |
| 2019/0377345 A1 | 12/2019 | Bachrach et al. |
| 2020/0014759 A1 | 1/2020 | Wunderlich |
| 2020/0032484 A1 | 1/2020 | ODonnell |
| 2020/0042013 A1 | 2/2020 | Kelkar et al. |
| 2020/0043347 A1 | 2/2020 | Wartofsky |
| 2020/0066147 A1 | 2/2020 | Vadillo et al. |
| 2020/0066163 A1 | 2/2020 | Emsbach et al. |
| 2020/0082731 A1 | 3/2020 | Choi et al. |
| 2020/0094964 A1 | 3/2020 | Myslinski |
| 2020/0103882 A1 | 4/2020 | Sullivan et al. |
| 2020/0130827 A1 | 4/2020 | Kozak |
| 2020/0145619 A1 | 5/2020 | Drako |
| 2020/0160106 A1* | 5/2020 | Sivalingam ............. G06T 5/002 |
| 2020/0183384 A1 | 6/2020 | Noh et al. |
| 2020/0207371 A1 | 7/2020 | Dougherty et al. |
| 2020/0250848 A1 | 8/2020 | Kim et al. |
| 2020/0262450 A1 | 8/2020 | Pan |
| 2020/0265701 A1 | 8/2020 | Schenker et al. |
| 2020/0265723 A1 | 8/2020 | Gordon et al. |
| 2020/0273353 A1 | 8/2020 | Oconnell et al. |
| 2020/0341471 A1 | 10/2020 | Kozak |
| 2020/0356115 A1 | 11/2020 | Kubie |
| 2020/0357288 A1 | 11/2020 | Stewart et al. |

FOREIGN PATENT DOCUMENTS

| | | |
|---|---|---|
| EP | 3525157 A1 | 8/2019 |
| EP | 3667451 A1 | 6/2020 |
| KR | 102160722 B1 | 9/2020 |
| TW | I693959 B | 5/2020 |
| WO | 2016210156 A1 | 12/2016 |
| WO | 2017055080 A1 | 4/2017 |

(56) References Cited

FOREIGN PATENT DOCUMENTS

| | | |
|---|---|---|
| WO | 2017065107 A1 | 4/2017 |
| WO | 2017068224 A1 | 4/2017 |
| WO | 2017157863 A1 | 9/2017 |
| WO | 2018052352 A1 | 3/2018 |
| WO | 2019006769 A1 | 1/2019 |
| WO | 2019235667 A1 | 12/2019 |
| WO | 2020057887 A1 | 3/2020 |
| WO | 2020072387 A1 | 4/2020 |

OTHER PUBLICATIONS

Graether, et al., Joggobot: A Flying Robot as Jogging Companion, CHI 2012, May 5, 2012, exertiongameslab.org downloaded from https://exertiongameslab.org/wp-content/uploads/2011/07/joggobot_chi2012.pdf, pp. 263-264.

Al Zayer, Majed, et al. "Exploring the Use of a Drone to Guide Blind Runners", Proceedings of the 18th International ACM SIGACCESS Conference on Computers and Accessibility, 2016, downloaded from https://rrl.cse.unr.edu/media/documents/2016/p263-alzayer.pdf.

Alshareef, Hazzaa N., and Dan Grigoras. "An adaptive task scheduler for a cloud of drones", 2018 4th International Conference on Cloud Computing Technologies and Applications (Cloudtech), IEEE, Nov. 2018, 9 pages.

Altawy, Riham and Youssef, Amr. M., "Security, Privacy, and Safety Aspects of Civilian Drones: A Survey", researchgate.net, ACM Transactions on Cyber-Physical Systems, Nov. 2016, 25 pages.

Amato, Andrew, "Projector Drone Turns Any Surface Into a Video Screen," DRONELIFE.com, dronelife.com, Jun. 26, 2014, 2 pages, downloaded from https://web.archive.org/web/20140804122610/https://dronelife.com/2014/06/26/projector-drone-turns-surface-video-screen/.

Bertram, Joshua R., Peng Wei, and Joseph Zambreno. "Scalable FastMDP for Pre-departure Airspace Reservation and Strategic De-conflict." arXiv preprint arXiv:2008.03518 (2020).

Blank, Peter; Kirrane, Sabrina; and Spiekerman, Sarah. "Privacy-Aware Restricted Areas for Unmanned Aerial Systems", computer.org. IEEE Computer and Reliability Societies, Mar./Apr. 2018, vol. 16, pp. 70-79.

Brock, Anke M., et al. "FlyMap: Interacting with Maps Projected from a Drone", Proceedings of the 7th ACM International Symposium on Pervasive Displays. 2018, 9 pages.

Bui, Khac-Hoai Nam, and Jason J. Jung, "Internet of agents framework for connected vehicles: A case study on distributed traffic control system", J. Parallel Distrib. Comput., (2017), 26 pages.

Cameron, Lori, "Building a Framework to Protect Your Privacy from Drones," computer.org. Accessed, Nov. 10, 2020, IEEE Computer Society, (2020), 2 pages.

Choi, Han-Lim, Luc Brunet, and Jonathan P. How, "Consensus-Based Decentralized Auctions for Robust Task Allocation", Robotics, IEEE Transactions on Robotics 25.4 (2009): 912-926.

Colley, Ashley, et al. "Investigating Drone Motion as Pedestrian Guidance", Proceedings of the 16th International Conference on Mobile and Ubiquitous Multimedia, 2017, 9 pages.

Frias-Martinez, Vanessa, Elizabeth Sklar, and Simon Parsons, "Exploring auction mechanisms for role assignment in teams of autonomous robots," Robot Soccer World Cup. Springer, Berlin, Heidelberg, 2004, 12 pages.

Irfan, Muhammad, and Adil Farooq, "Auction-based Task Allocation Scheme for Dynamic Coalition Formations in Limited Robotic Swarms with Heterogeneous Capabilities," 2016 International Conference on Intelligent Systems Engineering(ICISE). IEEE, 2016.

Isop, W., Pestana, J., Ermacora, G., Fraundorfer, F. & Schmalstieg, D., "Micro Aerial Projector—Stabilizing Projected Images of an Airborne Robotics Projection Platform", 2016 IEEE/RSJ International conference on Intelligent Robots and Systems (IROS), Daejeon convention Center, Oct. 2016, pp. 5618-5625.

Kamali, Maryam, et al. "Formal verification of autonomous vehicle platooning", Science of Computer Programming 148 (2017), 88-106 19 pages.

Lee, Eun-Kyu, et al., "Internet of Vehicles: From intelligent grid to autonomous cars and vehicular fogs", International Journal of Distributed Sensor Networks, vol. 12, No. 9, (2016), 14 pages.

Lucien, Laurent, et al., "A Proposition of Data Organization and Exchanges to Collaborate in an Autonomous Agent context", 2016 IEEE Intl Conference on Computational Science and Engineering (CSE) and IEEE Intl Conference on Embedded and Ubiquitous Computing (EUC) and 15th Intl Symposium on Distributed Computing and Applications for Business Engineering (DCABES), IEEE, 2016, 8 pages.

Minaeian, S., Liu, J., & Son, Y. (2018). "Effective and Efficient Detection of Moving Targets From a UAV's Camera", IEEE Transactions on Intelligent Transportation Systems, vol. 19, No. 2, Feb. 2018, pp. 497-506.

Pongpunwattana, Anawat, and Rolf Rysdyk. "Real-time planning for multiple autonomous vehicles in dynamic uncertain environments", Journal of Aerospace Computing, Information, and Communication 1.12 (2004): 580-604.

Porfiri, Maurizio, D. Gray Roberson, and Daniel J. Stilwell, "Tracking and Formation Control of Multiple Autonomous Agents: A two-level consensus approach", Automatica vol. 43, No. 8 (2007), pp. 1318-1328.

Raboin, Eric, et al. "Model-predictive asset guarding by team of autonomous surface vehicles in environment with civilian boats", Autonomous Robots 38.3 (2015), pp. 261-282.

Scheible, J. Funk, M. (2016). "In-Situ-DisplayDrone: Facilitating Co-located Interactive Experiences via a Flying Screen", In Proceedings of the 5th ACM International Symposium on Pervasive Displays (PerDis '16). Association for Computing Machinery, 251-252.

Scheible, Jurgen, et al. "Displaydrone: A Flying Robot Based Interactive Display", Proceedings of the 2nd ACM International Symposium on Pervasive Displays, 2013, 6 pages.

Schneider, Eric, et al. "Auction-based task allocation for multi-robot teams in dynamic environments." Conference Towards Autonomous Robotic Systems. Springer, Cham, 2015.

Xiang, Xianbo, Bruno Jouvencel, and Olivier Parodi, "Coordinated Formation Control of Multiple Autonomous Underwater Vehicles for Pipeline Inspection", International Journal of Advanced Robotic Systems, vol. 7, No. 1 (2010), pp. 075-084.

Yaacoub, Jean-Paul et al.,"Security analysis of drones systems: Attacks, limitations, and recommendations", Internet of Things 11, 2020, 40 pages.

Yu, Jun, et al. "iPrivacy: image privacy protection by identifying sensitive objects via deep multi-task learning." IEEE Transactions on Information Forensics and Security, vol. 12, No. 5, (2017): 1005-1016.

Zhu, Guodong, and Peng Wei. "Pre-Departure Planning for Urban Air Mobility Flights with Dynamic Airspace Reservation", AIAA Aviation 2019 Forum, 2019, 11 pages, downloaded from https://cpb-us-W2.wpmucdn.com/web.seas.gwu.edu/dist/9/15/files/2019/07/aviation19_PredeparturePlanning.pdf.

\* cited by examiner

UNCREWED AERIAL VEHICLE SHARED ENVIRONMENT PRIVACY AND SECURITY

The present disclosure relates generally to uncrewed aerial vehicle operations, and more particularly to methods, computer-readable media, and apparatuses for determining via at least one imaging sensor of an uncrewed aerial vehicle a location of a window in a shared environment and recording the location of the window in a map of the shared environment as a prohibited imaging zone, methods, computer-readable media, and apparatuses for determining by an uncrewed aerial vehicle based upon a map of a shared environment that at least one image includes an image portion that captures a location of at least one window and altering the at least one image to exclude the image portion, and methods, computer-readable media, and apparatuses for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, drones or autonomous aerial vehicles (AAVs) (broadly, "uncrewed aerial vehicles" (UAVs)) are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for determining via at least one imaging sensor of an uncrewed aerial vehicle a location of a window in a shared environment and recording the location of the window in a map of the shared environment as a prohibited imaging zone. For instance, in one example, a processing system including at least one processor may capture at least one image via at least one imaging sensor of an uncrewed aerial vehicle in a shared environment, detect a window within the at least one image, determine a location of the window in the shared environment, based upon a position of the uncrewed aerial vehicle and a distance between the uncrewed aerial vehicle and at least a portion of the window that is calculated from the at least one image, and record the location of the window in a map of the shared environment as a prohibited imaging zone.

In another example, the present disclosure describes a method, computer-readable medium, and apparatus for determining by an uncrewed aerial vehicle based upon a map of a shared environment that at least one image includes an image portion that captures a location of at least one window and altering the at least one image to exclude the image portion. For instance, in one example, a processing system of an uncrewed aerial vehicle including at least one processor may obtain a map of a shared environment, the map including a location of at least one window that is defined as a prohibited imaging zone, capture at least one image via at least one imaging sensor of the uncrewed aerial vehicle, and determine that the at least one image includes an image portion that correlates to the location of the at least one window, alter the at least one image to exclude the image portion. The processing system may then perform at least one of: providing the at least one image that is altered to exclude the image portion to at least one recipient device or storing the at least one image that is altered to exclude the image portion.

In still another example, the present disclosure describes a method, computer-readable medium, and apparatus for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor. For instance, in one example, a processing system of an uncrewed aerial vehicle including at least one processor may obtain a map of a shared environment, the map including a location of a window that is defined as a prohibited imaging zone, navigate the uncrewed aerial vehicle in the shared environment, determine based upon the map, a location of the uncrewed aerial vehicle, and an orientation of at least one imaging sensor of the uncrewed aerial vehicle, that the location of the window is within a field of view of the at least one imaging sensor, and disable or reorient the at least one imaging sensor when the location of the window is within the field of view of the at least one imaging sensor.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
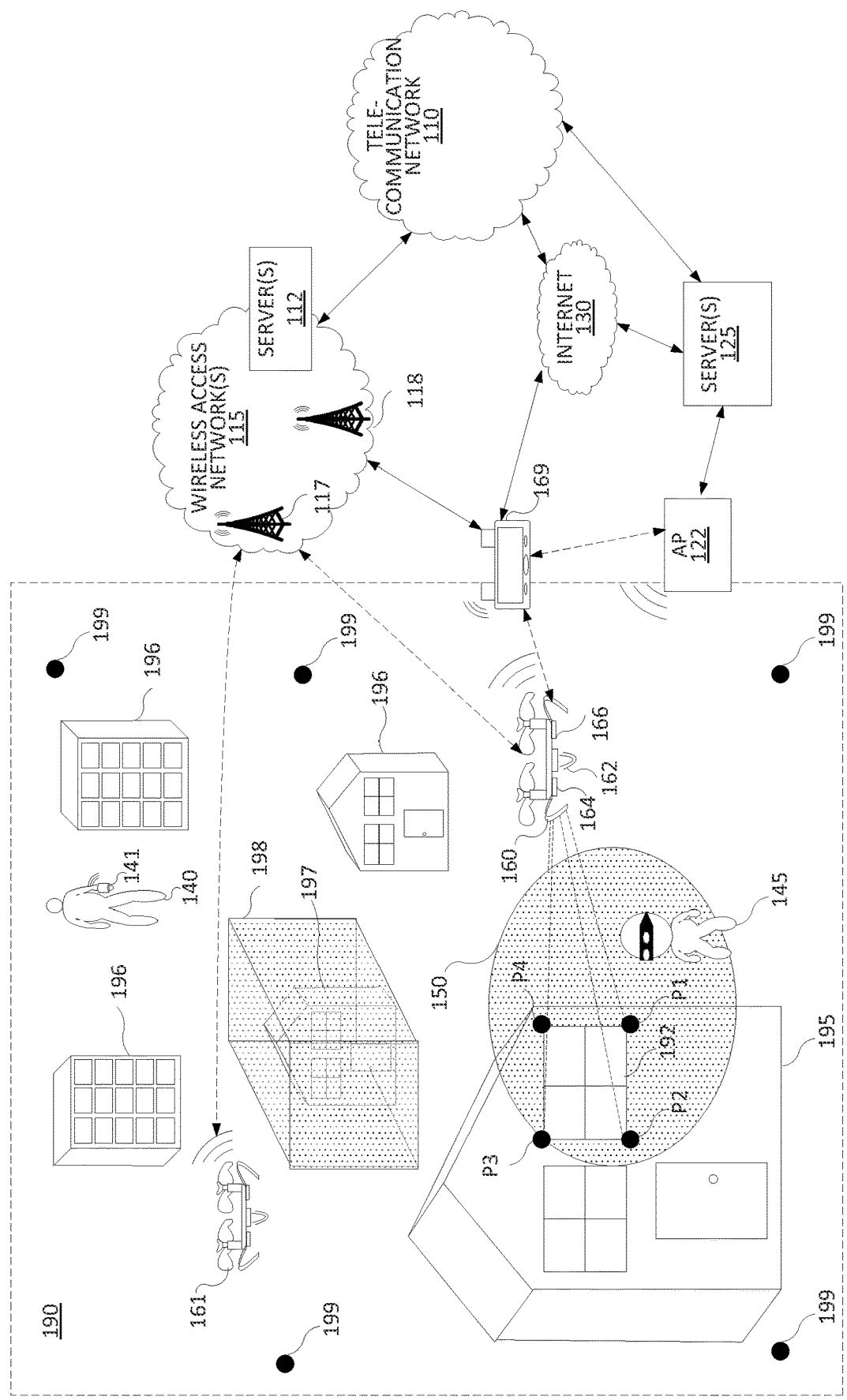
FIG. 1 illustrates an example system related to the present disclosure.

Examples of the present disclosure describe methods, computer-readable media, and apparatuses for determining via at least one imaging sensor of an uncrewed aerial vehicle a location of a window in a shared environment and recording the location of the window in a map of the shared environment as a prohibited imaging zone, methods, computer-readable media, and apparatuses for determining by an uncrewed aerial vehicle based upon a map of a shared environment that at least one image includes an image portion that captures a location of at least one window and altering the at least one image to exclude the image portion, and methods, computer-readable media, and apparatuses for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor. In particular, examples of the present disclosure provide an uncrewed aerial vehicle (UAV)-based system for security and privacy in a shared environment (where "uncrewed" may mean devoid of an onboard operator of the vehicle, also referred to as "unmanned"). In accordance with the present disclosure, an uncrewed vehicle (such as an uncrewed aerial vehicle (UAV)) may be remotely controlled by a human or an autonomous system, or may be self-operating or partially self-operating (e.g., a combination of on-vehicle and remote computing resources), such as an autonomous aerial vehicle (AAV). In one example, the present disclosure enables video surveillance to be performed in a shared area, or shared environment, in such a way that privacy is ensured within the content produced by the video surveillance for people who share the area. The shared area may be a residential neighborhood, a business community, or an educational community, for example, including but not limited to an apartment complex, a gated community of homes or buildings, an office complex, a business complex, e.g., a mall or a strip mall, buildings located on one or more public streets, an educational complex, e.g., schools, universities, colleges, campuses, and so forth. Examples of the present disclosure define and enforce prohibited imaging areas (and/or viewing areas) for which UAV image, video, and other sensor data capture is not permitted.

A shared environment or area may be defined using geographic coordinates, e.g., a global or spherical coordinate system. The coordinates may be stored by a security system and/or a UAV fleet management system (e.g., including a security service database (SSDB)). The coordinates stored may be, for instance, latitude and longitude, or other geographic coordinates that delineate a shared area e.g., geocentric coordinates (x,y,z), and the like. The coordinates may be stores as x-y points (or x-y-z points), or as ranges of points. This shared area may be served by one or more security UAVs that fly one or more flight paths to cover the area on a periodic or on-demand basis.

A mapping UAV may be used to identify areas that should be blocked from any image, video, and other sensor data capture, or "prohibited imaging zones." In particular, it may be decided by an entity controlling the shared area or among stakeholders of the shared area (e.g., homeowners, tenants, landlords, property managers, local town officials, etc.) that the security UAV(s) are not permitted to capture image or video content that may potentially contain image or video content captured from inside windows of houses or other buildings. In one example, one or more mapping UAVs may execute a mapping run to cover all of the geographic bounds of the shared area. A mapping UAV may be equipped with sensors including a video camera and a light detection and ranging (LiDAR) unit. A mapping UAV may also be equipped with location sensing capabilities (such as a Global Positioning System (GPS) unit, an altimeter, etc.) so that it is aware of its x-y-z location coordinates (for example, latitude-longitude-altitude in a world reference system). The mapping UAV may capture both optical images (e.g., including video and/or still images) via an optical camera and LiDAR readings, or images/renderings, in the same orientation as the optical camera during the mapping run. The data is then analyzed using one or more object detection models to identify windows of buildings.

To illustrate, the mapping UAV may track its x-y-z coordinates throughout the mapping run. In addition, using LiDAR data recorded throughout the mapping run, the UAV may determine the distance from the UAV (e.g., from the LiDAR unit) to various objects. A combination of the video and LiDAR data may be used to map window bounds within the space (e.g., the four corners of a rectangular window, or the circular boundary of a circular window, and the like). At the same time t1, LiDAR data provides the location in x-y-z coordinates of the four points in relation to the position of the mapping UAV. Since the mapping UAV tracks its own location in space (e.g., in x-y-z of a particular reference system), the location coordinates (e.g., in x-y-z) of the four points in the same reference system may be calculated. The x-y-z location coordinates of the four corners of the window may be stored in the SSDB with an indication that the points define a boundary of a prohibited imaging zone. The prohibited imaging zone may also be stored in a database, or map accessible to a wider scope of security UAVs, delivery UAVs, commercial UAVs, private UAVs, and others.

In an illustrative example, a neighborhood security UAV may be deployed within the shared area with a map containing one or more prohibited imaging zones (e.g., including at least one window as detected and defined above). As the security UAV traverses a flight path, the security UAV may approach such a prohibited imaging zone. The security UAV has access to the no-video zone coordinate data in the SSDB. The security UAV may be equipped with an optical camera and/or an infrared camera, or the like. The security UAV may be configured and/or calibrated to have awareness of the field-of-view and range of these sensors as they relate to the security UAV.

When any prohibited imaging zone enters the field of view and range of one or more of the imaging sensors, the imaging sensors may be temporarily disabled, or the recorded image(s) may be altered to exclude the captured data content for the prohibited imaging zone, e.g., overwritten with blank data, pixelated or otherwise obscured, replaced with a different data content (e.g., a generic window, an image of the actual window previously obtained and stored, e.g., with consent of a property owner or other(s) with an interest in the property), etc. In another example, the security UAV imaging sensors may be oriented in any direction other than that of the prohibited imaging zone.

A prohibited imaging zone may also be defined by specification of coordinates without particular detection of a window or other object. For example, if a homeowner wants to opt-out (e.g., withholding consent) of the security service, the entire property bounds may be defined as a prohibited imaging zone. Prohibited imaging zones may also be activated and deactivated. For instance, prohibited imaging zone data in the SSDB may have an associated owner, e.g., identified by a user ID and password or other credentials.

The owner may permit the owner's own UAV to record images (e.g., video, LiDAR images/renderings, etc.) within a prohibited imaging zone, while all other UAVs may be subject to the no recording restrictions.

In one example, when traversing a flight path, a security UAV may use onboard object detection models to detect conditions in images that are not expected (e.g., with respect to expected conditions that may be stored in the SSDB). For instance, within a neighborhood, the residents may opt-in (e.g., providing consent) to providing data to the SSDB regarding expected package deliveries or service technician calls. In addition, unexpected conditions may include changes to structures within the shared environment, e.g., a tree falling on a house, a wall collapse, etc., dangerous conditions, such as fire or flooding, and so on. These and other aspects of the present disclosure are discussed in greater detail below in connection with the examples of FIGS. 1-5.

To aid in understanding the present disclosure, FIG. 1 illustrates an example system 100, related to the present disclosure. As shown in FIG. 1, the system 100 connects user device 141, server(s) 112, server(s) 125, uncrewed aerial vehicles (UAVs 160-161), remote control device 169, and so forth, with one another and with various other devices via a core network, e.g., a telecommunication network 110, a wireless access network 115 (e.g., a cellular network), and Internet 130.

Figure 2:
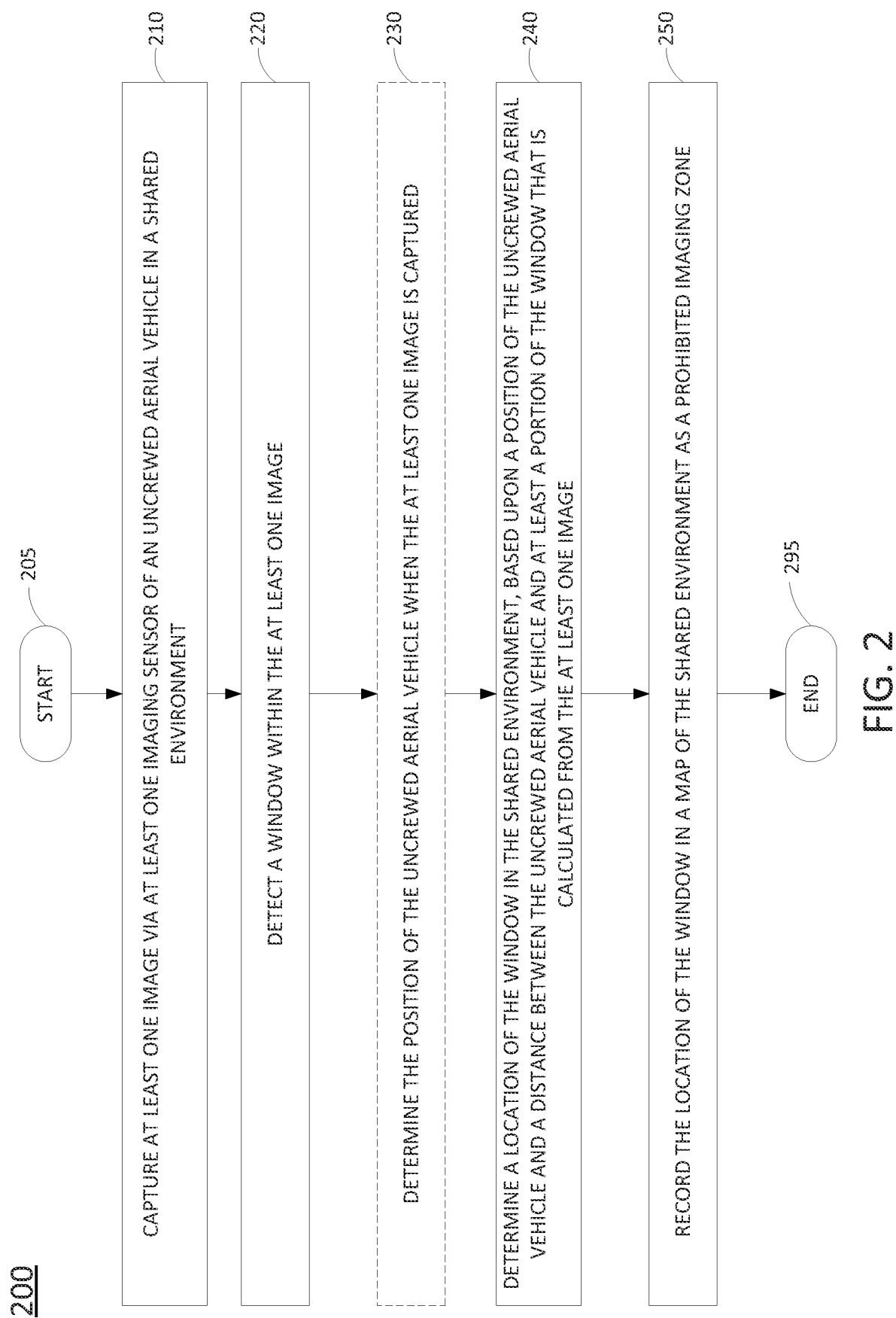
FIG. 2 illustrates a flowchart of an example method for determining via at least one imaging sensor of an uncrewed aerial vehicle a location of a window in a shared environment and recording the location of the window in a map of the shared environment as a prohibited imaging zone, in accordance with the present disclosure.
Figure 5:
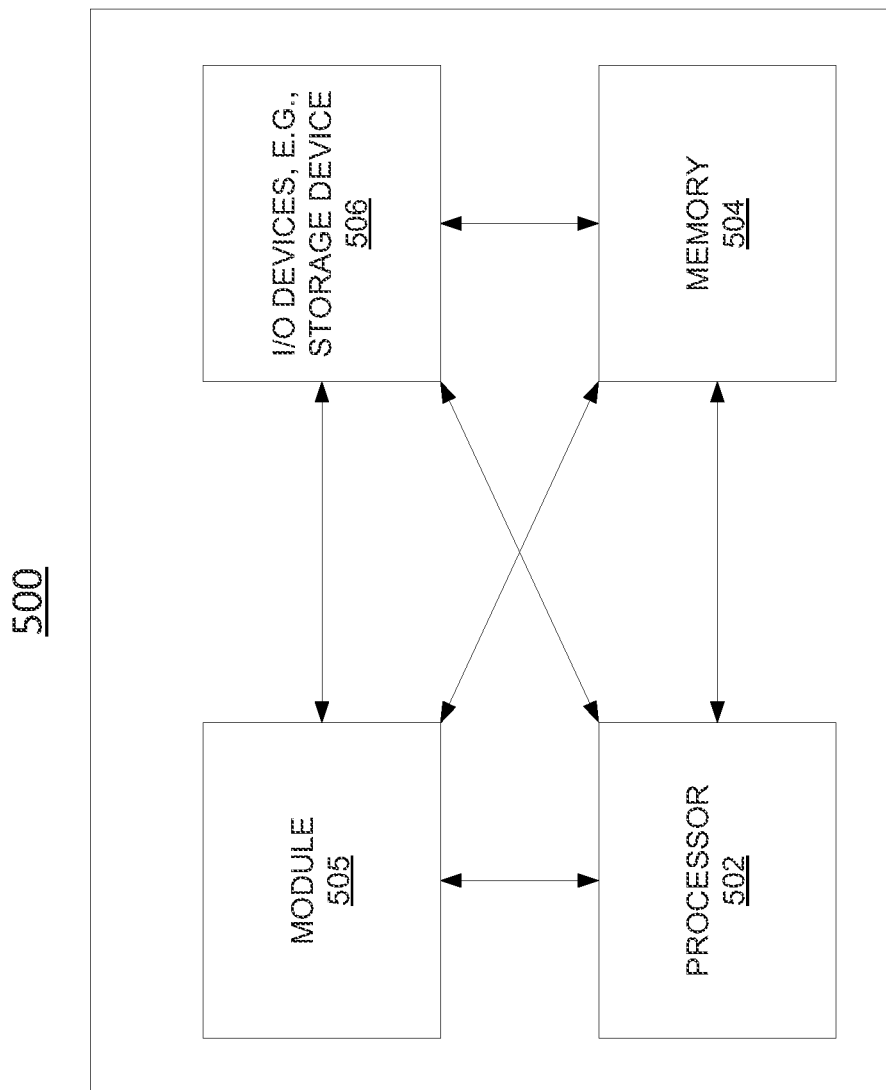
FIG. 5 illustrates an example high-level block diagram of a computing device specifically programmed to perform the steps, functions, blocks, and/or operations described herein.

In one example, the server(s) 125 may each comprise a computing device or processing system, such as computing system 500 depicted in FIG. 5, and may be configured to perform one or more steps, functions, or operations for determining via at least one imaging sensor of an uncrewed aerial vehicle a location of a window in a shared environment and recording the location of the window in a map of the shared environment as a prohibited imaging zone. For instance, an example method 200 for determining via at least one imaging sensor of an uncrewed aerial vehicle a location of a window in a shared environment and recording the location of the window in a map of the shared environment as a prohibited imaging zone is illustrated in FIG. 2 and described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

In one example, server(s) 125 may comprise a security system for a shared environment. In one example, the security system may comprise a UAV fleet management system. For instance, server(s) 125 may receive and store information regarding UAVs, such as (for each UAV): an identifier of the UAV, a maximum operational range of the UAV, a current operational range of the UAV, capabilities or features of the UAV, such as maneuvering capabilities, payload/lift capabilities (e.g., including maximum weight, volume, etc.), sensor and recording capabilities, lighting capabilities, visual projection capabilities, sound broadcast capabilities, and so forth. In one example, server(s) 125 may manage or support UAVs that are deployed for performing tasks within shared environment 190, e.g., security surveillance or other image gathering tasks. For instance, server(s) 125 may obtain requests to perform tasks from personnel of the facility 190, other automated systems, etc., may assign AAVs to particular tasks, may track task completions, and so forth. Server(s) 125 may also store a map or mapping data of shared environment 190, and provide the map or mapping data to UAVs, may update the map or mapping data as new information is collected form UAVs, and so forth. The shared environment may comprise, for example, a residential community, an apartment complex, an office complex, and so forth.

In addition, server(s) 125 may store detection models that may be applied to sensor data from UAVs, e.g., in order to detect items or objects (which may specifically include windows (broadly including any building structures having see-through glass), and which may also include humans or animals, and so on). For instance, in one example, UAVs may include on-board processing systems with one or more detection models for detecting items or objects. However, as an alternative, or in addition, UAVs may transmit sensor data to server(s) 125, which may apply detection models to the sensor data in order to similarly detect items or objects.

The MLMs, or signatures, may be specific to particular types of visual/image and/or spatial sensor data, or may take multiple types of sensor data as inputs. For instance, with respect to images or video, the input sensor data may include low-level invariant image data, such as colors (e.g., RGB (red-green-blue) or CYM (cyan-yellow-magenta) raw data (luminance values) from a CCD/photo-sensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features could be used to help quantify and distinguish shimmering water, a flag on a flagpole, an animate object, such as a human or animal, a vehicle, and so forth from other types of images/object and/or other features.

As noted above, in one example, MLMs, or signatures, may take multiple types of sensor data as inputs. For instance, MLMs or signatures may also be provided for detecting particular items based upon LiDAR input data and/or optical camera input data. In accordance with the present disclosure, a detection model may comprise a machine learning model (MLM) that is trained based upon the plurality of features available to the system (e.g., a "feature space"). For instance, one or more positive examples for a feature may be applied to a machine learning algorithm (MLA) to generate the signature (e.g., a MLM). In one example, the MLM may comprise the average features representing the positive examples for an item in a feature space. Alternatively, or in addition, one or more negative examples may also be applied to the MLA to train the MLM. The machine learning algorithm or the machine learning model trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, a trained detection model may be configured to process those features which are determined to be the most distinguishing features of the associated item, e.g., those features which are quantitatively the most different from what is considered statistically normal or average from other items that may be detected via a same system, e.g., the top 20 features, the top 50 features, etc.

In one example, detection models (e.g., MLMs) may be deployed in UAVs, and/or in a network-based processing system to process sensor data from one or more UAV sensor sources (e.g., cameras, LiDAR, or the like), and to identify patterns in the features of the sensor data that match the detection model(s) for the respective item(s). In one example, a match may be determined using any of the visual features mentioned above, e.g., and further depending upon the weights, coefficients, etc. of the particular type of MLM. For instance, a match may be determined when there is a threshold measure of similarity among the features of the sensor data streams(s) and an item signature, e.g., a window.

In one example, server(s) 125 may store detection models that may be provided to UAVs and/or applied by server(s) 125, in-network, to input data from cameras and/or LiDAR units to detect various "conditions," e.g., unexpected conditions, such as "fire," "flooding," "fight," "break-in," "stalking," or the like. For instance, MLM detection models may be similarly trained to detect these types of conditions which may be present in visual and/or spatial sensor data, but which may not necessarily comprise "objects." In this regard, it should be noted that as referred to herein, an "unexpected condition" may comprise a presence of an unknown item or object (which may include unknown humans or animals) within the shared environment 190, or may include defined conditions that may be found in the shared environment that do not necessarily comprise "objects" (e.g., as defined by at least one detection model for such a condition).

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, user device 141, UAV 160, UAV 161, and remote control device 169 may be in communication with base stations 117 and 118, which provide connectivity between user device, 141, UAVs 160-161, remote control device 169 and other endpoint devices within the system 100, various network-based devices, such as server(s) 112, server(s) 125, and so forth. In one example, wireless access network(s) 115 may be operated by the same service provider that is operating telecommunication network 110, or one or more other service providers.

For instance, as shown in FIG. 1, wireless access network(s) 115 may also include one or more servers 112, e.g., edge servers at or near the network edge. In one example, each of the server(s) 112 may comprise a computing device or processing system, such as computing system 500 depicted in FIG. 5 and may be configured to provide one or more functions determining via at least one imaging sensor of an uncrewed aerial vehicle a location of a window in a shared environment and recording the location of the window in a map of the shared environment as a prohibited imaging zone. For example, one or more of the server(s) 112 may be configured to perform one or more steps, functions, or operations in connection with the example method 200 described below. In one example, server(s) 112 may perform the same or similar functions as server(s) 125. For instance, telecommunication network 110 may provide a security system for shared environment(s) and/or a UAV fleet management system, e.g., as a service to one or more subscribers/customers, in addition to telephony services, data communication services, television services, etc. In one example, server(s) 112 may operate in conjunction with server(s) 125 to provide an UAV fleet management system and/or a network-managed, or network-supported UAV-based security service. For instance, server(s) 125 may provide more centralized services, such as UAV authorization and tracking, maintaining user accounts, creating new accounts, tracking account balances, accepting payments for services, etc., while server(s) 112 may provide more operational support to UAVs, such as deploying MLMs/detection models for detecting objects and/or conditions, for obtaining location information of user devices (e.g., from a cellular/wireless network service provider, such as an operator of telecommunication network 110 and wireless access network(s) 115), and providing such information to UAVs, for updating maps of shared environments with prohibited imaging zones and/or providing such maps to UAVs, and so on. It is noted that this is just one example of a possible distributed architecture for UAV-based security system and/or UAV fleet management system. Thus, various other configurations including various data centers, public and/or private cloud servers, and so forth may be deployed. For ease of illustration, various additional elements of wireless access network(s) 115 are omitted from FIG. 1.

As illustrated in FIG. 1, user device 141 may comprise, for example, a wireless enabled wristwatch. In various examples, user device 141 may comprise a cellular telephone, a smartphone, a tablet computing device, a laptop computer, a head-mounted computing device (e.g., smart glasses), or any other wireless and/or cellular-capable mobile telephony and computing devices (broadly, a "mobile device" or "mobile endpoint device"). In one example, user device 141 may be equipped for cellular and non-cellular wireless communication. For instance, user device 141 may include components which support peer-to-peer and/or short range wireless communications. Thus, user device 141 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth. In another example, user device 141 may instead comprise a radio frequency identification (RFID) tag that may be detected by UAVs or other RFID reader-equipped device or systems.

In accordance with the present disclosure, UAV 160 may include a camera 162 and one or more radio frequency (RF) transceivers 166 for cellular communications and/or for non-cellular wireless communications. In one example, UAV 160 may also include one or more module(s) 164 with one or more additional controllable components, such as one or more: microphones, loudspeakers, infrared, ultraviolet, and/or visible spectrum light sources, projectors, light detection and ranging (LiDAR) unit(s), temperature sensors (e.g., thermometers), and so forth. In addition, UAV 160 may include a cargo handling element 167. As illustrated, cargo handling element 167 may comprise a lift hook or clamp for engaging a cargo carrier, e.g., a basket and the like. However, in another example, cargo handling element 167 may alternatively or additionally comprise an internal cargo compartment in which to receive and transport an item or object. It should be noted that UAV 161 may be similarly equipped. However, for ease of illustration, specific labels for such components of UAV 161 are omitted from FIG. 1.

In addition, each of the UAVs 160 and 161 may include on-board processing systems to perform steps, functions, and/or operations for controlling various components of the respective UAVs, and for determining by an uncrewed aerial vehicle based upon a map of a shared environment that at least one image includes an image portion that captures a location of at least one window and altering the at least one image to exclude the image portion and/or for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor. For instance, UAVs 160 and 161 may each comprise all or a portion of a computing device or processing system, such as computing system 500 as described in connection with FIG. 5 below, specifically configured to perform various steps, functions, and/or operations of the example method 300 and/or the example method 400 discussed below and illustrated in FIGS. 3 and 4, respectively.

In an illustrative example, the shared environment 190 may comprise a residential community having several buildings 195-197 therein. The buildings 195-197 may comprise houses, apartment buildings, or the like. Continuing with the present example, the shared environment 190 may utilize UAVs (including AAVs or remote controlled UAVs) to perform various tasks therein, such as navigating flight paths within or over the shared environment 190, capturing images of various areas within the shared environment 190, searching for and detecting any unexpected conditions, reporting and investigating any unexpected conditions that are detected, and so forth. In one example, the assignment of tasks to UAVs and the management of the airspace of the shared environment 190 may be provided by a UAV-based security management system, which may comprise server(s) 125 and/or server(s) 112. In this case, the security management system may assign to UAV 160 a task of generating a map of the shared environment (e.g., a three-dimensional (3D) map), or collecting mapping data for generating and/or updating such a map. In particular, UAV 160 may be assigned to detect windows within the shared environment 190, to determine the locations of such windows and to record the locations of one or more windows in the map as prohibited imaging zones.

In the present example, the UAV 160 may comprise an AAV (e.g., without remote control) that is provided with a flight path and/or an assigned area of the shared environment 190, with instructions to traverse the area and capture images (e.g., including still images, video and/or LiDAR sensor data (e.g., LiDAR images/renderings), or the like). However, it should be understood that in other examples, UAV 160 may be controlled by a human operator, such as via remote control device 169. As illustrated in FIG. 1, UAV 160 may have at least one imaging and/or spatial sensor having a field-of-view 150 from which at least one image may be captured. In one example, UAV 160 may capture image and/or spatial sensor data comprising optical image(s) and/or LiDAR images/renderings. In an example, where both optical camera and LiDAR images/renderings are both obtained, the field-of-view 150 may represent the fields-of-view of both imaging sensors. However, in another example, the fields-of-view may be different.

As noted above, UAVs, such as UAV 160 may obtain object or condition detection models (e.g., MLMs) from server(s) 125 and/or server(s) 112, e.g., including at least one detection model for detecting windows from within one or more images. In the present example, UAV 160 may capture one or more images within field-of-view 150, which may include a window 192. The window 192 may be detected by UAV 160 by applying the one or more captured images as input(s) to a window detection model (and in one example, to other detection models for detecting other conditions and/or objects of interest). As such, UAV 160 may distinguish window 192 from the surrounding visual data captured in the one or more images. In one example, the detection model for detecting windows may additionally be configured to detect and output boundaries of windows that are determined. In one example, the one or more images may include LiDAR images/renderings. In one example, the one or more images may additionally include images from an optical camera of UAV 160.

In addition, UAV 160 may also track its own position within a three-dimensional space. For example, the position of UAV 160 may be determined from a GPS unit of UAV 160 and an altimeter, or a calculation of a distance to at least one reference point (e.g., one of reference points 199 within the shared environment 190). For instance, reference points 199 may each comprise a reflector or a wireless beacon at a known geographic position. In one example, the calculation of the distance to the at least one reference point 199 may be based upon the at least one image that is captured (e.g., a LiDAR image/rendering that may include the one of the reference points 199). In another example, UAV 160 may capture a different set of one or more images (and/or obtain LiDAR sensor data) to determine a range/distance to one or more of the reference points 199 and then capture the one or more images within field-of-view 150 that include the window 192. In one example, UAV 160 may translate its position in one reference coordinate system into a position in another reference coordinate system (e.g., translating from a local coordinate system for shared environment 190 to a global/world reference coordinate system, or vice versa). In one example, UAV 160 may confirm its position (e.g., in x-y-z, or latitude-longitude-elevation/altitude) via ranging to reference point(s) 199 and via location detection via a GPS unit and altimeter. In still another example, UAV 160 may determine its location via a GPS unit in conjunction with LiDAR sensing of a height/altitude over ground. Thus, various combinations of different technologies may be deployed in different examples, for different UAVs having different components and capabilities, and so forth.

The UAV 160 may determine the distance from the UAV 160 (e.g., from the LiDAR unit) to different objects, surfaces, etc., in the shared environment. For instance, image recognition analysis of a video frame or still image x at time t1 may identify the portion of the image bounded by points P1, P2, P3, and P4 as window 192 (e.g., the four corners of a rectangular window). At the same time t1, LiDAR data provides the location in x-y-z coordinates of the four points P1-P4 in relation to the position of UAV 160 (e.g., a distance to the LiDAR unit of UAV 160). Since the UAV 160 tracks its own location in space (e.g., in x-y-z of a particular reference system), the location coordinates (e.g., in x-y-z) of the four points P1-P4 in the same reference system may be calculated. As such, the x-y-z location coordinates of the space defined by the points P1-P4 (the four corners of the window 192) may be added to a map of the shared environment 192 with an indication that the points P1-P4 define a boundary of a prohibited imaging zone. In one example, UAV 160 may store the points P1-P4 with an indication that these points comprise a window, or prohibited imaging zone. Alternatively, or in addition, at a same time, or at a later time, UAV 160 may provide the points P1-P4, along with an indication that these points comprise a window, or prohibited imaging zone, to server(s) 125 and/or server(s) 112. The server(s) 125 and/or server(s) 112 may then update a stored map of the shared environment 190 with these points and the indication of the prohibited imaging zone defined by such points P1-P4 (i.e., window 192).

In a same or similar manner, UAV 160 and/or other UAVs may capture images from within/above shared environment 190, may detect other windows, define the bounds thereof, may determine the positions of such windows in space, and may likewise provide notification to server(s) 125 and/or server(s) 112 to include these windows as prohibited imaging zones in the map. It should be noted that not all windows will be designated permanently as prohibited imaging zones after being detected as such and/or added to the map. For instance, property owners or others with interest in various properties of the shared environment 190 may designate entire properties as acceptable imaging zones, e.g., a store owner may want all of its windows including glass doors to be monitored. Similarly, property owners or others with interest in various properties of the shared environment 190 may designate entire properties as acceptable imaging zones as prohibited imaging zones, such as prohibited imaging zone 198 around building 197. In one example, property owners or other entities may utilize an interface that provides access to the map, with indications of designated prohibited imaging areas, and the property owners or other entities may de-select certain windows or other designated prohibited imaging areas as areas of allowed recording (e.g., upon confirming a legitimate property interest or other rights to the property). Alternatively, or in addition, certain windows or other prohibited imaging zones may be designated as allowed imaging zones at certain times of day, days of the week, etc. (e.g., during business hours, while there is daylight, and so on) and prohibited imaging zones at others (e.g., during non-business hours, while there is no daylight, and so on).

The server(s) 125 and/or server(s) 112 may provide the map of shared environment 190 to any UAVs operating therein, which may be required to abide by the restrictions set forth in the map, including designated prohibited imaging areas (e.g., windows, entire properties, etc.). In one example, the map may include other restrictions, such as no flyover zones, quiet zones, etc. In the example, of FIG. 1, UAV 161 may be tasked with surveilling shared environment 190 (e.g., autonomously, or under the control of a remote operator, such as via remote control device 169). The UAV 161 may therefore load the map of shared environment 190. As such, as UAV 161 traverses/navigates along a flight path within shared environment 190, it may determine its own location (e.g., in a same or a similar manner as discussed above with regard to UAV 160), may capture at least one image via at least one imaging sensor of UAV 161 (e.g., LiDAR, optical camera, infrared camera, etc.), and may determine that the at least one image includes an image portion that correlates to the location of the at least one window.

For example, UAV 161 may be aware of the field-of-view and ranges of onboard imaging sensors (e.g., optical camera(s), LiDAR unit(s), etc.) as well as the orientations of such imaging sensor(s). Combined with its own position information, UAV 161 may determine when any points or prohibited imaging zones defined by a set of points are within such field-of-view. To illustrate, in the example of FIG. 1, any portion or all of the prohibited imaging zone defined by points P1-P4 (window 192) may enter the field-of-view of one or more imaging sensors of UAV 160 as UAV 160 performing surveillance of the share environment 190. Upon detecting that any of the prohibited imaging zone is in the field-of-view, in one example, UAV 160 may continue to capture at least one image via the at least one imaging sensor, but may alter the at least one image to exclude the image portion that correlates to the location of the window 192. It should be noted that UAV 160 need not detect or recognize that the image portion corresponds to a window. Rather, UAV 160 may determine that the image portion corresponds to the prohibited imaging zone and may alter the at least one image accordingly. The altering may include overwriting an original content of the at least one image portion of the at least one image such that the original content is irretrievably lost, i.e., the portion of the image containing the window cannot be recovered due to the overwriting image processing operation. For instance, the original content may be overwritten with blank data, pixelated or otherwise obscured, replaced with a different data content (e.g., a generic window, an image of the actual window 192 previously obtained and stored, e.g., with consent of a property owner or other(s) with an interest in the property), etc.

In another example, imaging sensors of UAV 160 may be oriented in any direction other than that of the prohibited imaging zone when it is approaching the prohibited imaging zone or when the prohibited imaging zone is detected to be within the field-of-view of at least one imaging sensor of AAV 160. In still another example, one or more of the imaging sensor(s) may be disabled based upon the same or similar criteria. For instance, an optical camera and/or infrared camera may be disabled, while a LiDAR unit may remain activated. However, in another example, it is specifically the case that imaging sensors remain active and recording/capturing one or more images, while altering the at least one image to exclude the image portion that correlates to the prohibited imaging zone (e.g., window 192). For instance, as shown in FIG. 1, there may be a would-be burglar 145 lurking outside the window 192. Thus, while it may be generally desirable to not capture visual data of the window 192, it may be preferred to capture visual data from nearby (and directly adjacent to the window 192), to help detect any unusual conditions (such as burglar 145).

In this regard, it should be noted that UAV 160 may have various detection models for various objects or other conditions, which UAV 160 may apply on an ongoing basis to captured image sensor data (e.g., at least one image) to detect such things as any humans present, animals, vehicles, conditions such as fire, flooding, fighting, break-in, stalking, etc., and so on. It should also be noted that in one example, stakeholders of the shared environment, such as owners, tenants, property managers, security personnel, employees, guests, delivery services, property maintenance services, etc. may register various activities or presences with server(s) 125 and/or server(s) 112, such as a scheduled delivery, an intention to go for a walk, an expected arrival of a guest, etc. Thus, a guest's vehicle may be registered upon or before arrival at the shared environment 190. If and when the guest's vehicle may be detected by UAV 160 and/or others, it may either not be detected as an unexpected condition, or if notified by UAV 160 to server(s) 125 and/or server(s) 112, the server(s) 125 and/or server(s) 112, such reporting may be ignored.

In still another example, UAVs in shared environment, such as UAV 161, may track authorized people via RFID or other wireless sensing mechanisms, such as detecting user device 141 of person 140 via Institute of Electrical and Electronics Engineers (IEEE) 802.11 based communications (e.g., Wi-Fi Direct) Long Term Evolution (LTE) Direct, a 5G device-to-device (D2D) sidelink, such as over a P5 interface, and so forth), via Dedicated Short Range Communications (DSRC), e.g., in the 5.9 MHz band, or the like, and so on. Thus, for example, UAV 161 may capture one or more images in the shared environment 190, may apply the one or more images as input(s) to one or more detection models, and may detect a "person" or "human" when the images include person 140. However, upon detection of user device 141, UAV 161 may match the location of the detected "person" or "human" with a location of user device 141 as determined via communication with and/or wireless sensing of such user device 141. For example, the user device 141 may be registered with the server(s) 125 and/or server(s) 112, which may be provided to UAV 161. For instance, the shared environment 190 may require that all personnel, residents, visitors, etc. carry RFID tags that may be sensed by UAVs operating therein. As such, UAV 161 may determine that this is not an unexpected condition, and may not send a notification to the server(s) 125 and/or server(s) 112. In an example, where UAV 161 is controlled by a human operator via remote control device 169, the UAV 161 may not provide an enhanced notification to the remote control device 169.

On the other hand, burglar 145 may be detected in the at least one image captured by UAV 160 that includes the image portion that correlates to the location of the window 192. However, there may be no detection of any identification of such person (e.g., an authorized RFID tag, an authorized mobile phone or other user device, etc.). As such, the presence of burglar 145 may be reported as an unexpected condition. In one example, UAV 160 may forward one or more images that identify the unexpected condition (e.g., the burglar 145) to server(s) 125 and/or server(s) 112, to the remote control device 169 with a highlighting of the unexpected condition, and/or to one or more other devices, such as a monitoring station of a security guard of the shared environment 190. Notably, however, the portion(s) of the image(s) corresponding to the window 192 may still be overwritten to maintain the privacy of any persons or other entities having an interest in the property, e.g., with respect to any other person who may review the image(s) in real time or upon retrieval from a storage repository.

In various examples, UAV 160 and/or UAV 161 may provide additional operations. For instance, UAV 161 may record any changes to the map and/or mapping data that it detects. UAV 161 may also notify server(s) 125 and/or server(s) 112 of the change(s) so that server(s) 125 and/or server(s) 112 may update the stored map and/or mapping data with the most recent information. In addition, UAV 161 may be an AAV that operates autonomously, and which may record footage for temporary storage, e.g., for two weeks, one month, etc. UAV 161 may transmit a live video feed to the monitoring station on demand or upon detection of unexpected condition. For an unexpected condition, UAV 161 may be configured to maintain view and contact, e.g., by circling overhead or maintaining position, any may wait until an operator at a monitoring station releases the UAV 161 back to continuing surveillance.

In addition, the foregoing illustrates just one example of a system in which examples of the present disclosure for determining via at least one imaging sensor of an uncrewed aerial vehicle a location of a window in a shared environment and recording the location of the window in a map of the shared environment as a prohibited imaging zone, for determining by an uncrewed aerial vehicle based upon a map of a shared environment that at least one image includes an image portion that captures a location of at least one window and altering the at least one image to exclude the image portion, and or for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor may operate. It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure. In still another example, severs(s) 112 may reside in telecommunication network 110, e.g., at or near an ingress node coupling wireless access network(s) 115 to telecommunication network 110, in a data center of telecommunication network 110, or distributed at a plurality of data centers of telecommunication network 110, etc. Additionally, devices that are illustrated and/or described as using one form of communication (such as a cellular or non-cellular wireless communications, wired communications, etc.) may alternatively or additionally utilize one or more other forms of communication. For instance, in one example, server(s) 125 may communicate with UAV 160, such as for assigning tasks to UAV 160, monitoring for task completion, etc. via a wireless access point (AP) 122. For instance, server(s) 125 may be owned or operated by the same entity owning or controlling the facility 190, and may have one or more wireless access points, such as AP 122, deployed throughout the facility 190. Thus, communications between server(s) 125 and UAV 160 may not traverse any networks external to the entity. For instance, AP 122 and UAV 160 may establish a session via Wi-Fi Direct, LTE Direct, a 5G D2D sidelink, a DSRC session/pairing, etc.

As noted above, the server(s) 125 and/or server(s) 112 may provide the map of shared environment 190 to any UAVs operating therein, which may be required to abide by the restrictions set forth in the map, including designated prohibited imaging areas (e.g., windows, entire properties, etc.). This may apply to all UAV managed by or via the server(s) 125 and/or server(s) 112, as well as any guest or visitor UAVs. For instance, delivery UAVs may enter the shared environment 190 and may not be performing tasks under the direction of server(s) 125 and/or server(s) 112. However, such delivery UAVs or others may be required to obtain the map (with restrictions) and to abide by such restrictions, e.g., associated with prohibited imaging zones.

In one example, server(s) 125 and/or server(s) 112 may enforce prohibited imaging zones via a wireless channel sensing technique. For instance, prohibited imaging zones may be illuminated periodically or on some other basis, e.g., randomly or semi-randomly, when UAV presence is detected nearby via rough RF sensing, etc. For example, visible or other lighting options (e.g., various colored lights, pulsating lights, etc.) may be directed to illuminate a window. If any UAV is recording and streaming images/video of this window at such time, detectable pattern changes in the wireless downlink signals from the UAV to a remote control device or other ground-based recipients may occur in response to the change in illumination. Furthermore, a pattern of pulsed light illuminating the window may result in a corresponding pattern change in the wireless signals emanating from the UAV. Thus, non-compliance with the prohibited imaging zone may be detected in at least this way. In one example, server(s) 125 and/or server(s) 112 may engage in one or more remedial actions, such as notifying authorities, notifying a monitoring station of security personnel of the shared environment 190, dispatching another UAV (e.g., an AAV) to intercept and capture, if necessary, the non-compliant UAV, and so forth. Thus, these and other modifications are all contemplated within the scope of the present disclosure.

FIG. 2 illustrates a flowchart of an example method 200 for determining via at least one imaging sensor of an uncrewed aerial vehicle a location of a window in a shared environment and recording the location of the window in a map of the shared environment as a prohibited imaging zone. In one example, steps, functions and/or operations of the method 200 may be performed by a device or apparatus as illustrated in FIG. 1, e.g., by one or more of server(s) 125 and/or server(s) 112, or any one or more components thereof, or by server(s) 125 or servers 112, and/or any one or more components thereof in conjunction with one or more other components of the system 100, such as elements of wireless access network 115, telecommunication network 110, mobile device 141, UAVs 160-161, and so forth. In another example, steps, functions and/or operations of the method 200 may be performed by a UAV, such as UAV 160, and/or UAV 160 in conjunction with other components of the system 100, such as server(s) 125 and/or server(s) 112, etc. In one example, the steps, functions, or operations of method 200 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 200. Similarly, in one example, the steps, functions, or operations of the method 200 may be performed by a processing system comprising one or more computing devices collectively configured to perform various steps, functions, and/or operations of the method 200. For instance, multiple instances of the computing system 500 may collectively function as a processing system. For illustrative purposes, the method 200 is described in greater detail below in connection with an example performed by a processing system. The method 200 begins in step 205 and proceeds to step 210.

At step 210, the processing system captures at least one image via at least one imaging sensor of an uncrewed aerial vehicle (UAV) in a shared environment. For instance, as discussed above, the at least one imaging sensor may comprise at least one of an optical camera or a LiDAR unit of the UAV. As also discussed above, the shared environment may comprise a residential complex (e.g., individual homes, condos, townhouses, apartments, etc. serving as residences), an educational complex (e.g., universities, colleges, schools, campuses, etc.), a business complex (e.g., office buildings, retail establishments, malls, strip malls, etc.), or the like. In one example, a notification may be provided to entities associated with the shared environment of a scheduled time of the capturing of the at least one image. For instance, preparations may be made to anticipate a one-time recording of images for locations that will become prohibited imaging zones (e.g., windows of buildings in the shared environment). The notified entities may include homeowners, tenants, landlords, property managers, local town officials, etc. In one example, the UAV may fly a predefined route to cover the shared environment from all vantages or from a sufficient sampling of vantages. In one example, multiple UAVs may be deployed such that the UAV of the subject method 200 may be assigned a portion of the shared environment. In one example, the UAV may be an AAV, or could be controlled remotely by a human operator.

At step 220, the processing system detects a window within the at least one image. For instance, the window may be identified by applying the at least one image as an input to at least one object detection model (e.g., an object detection model that is trained to detect windows or building structures with see-through glass panels within the captured images). In one example, the at least one object detection model is further trained to determine boundaries of windows within the captured images.

At optional step 230, the processing system may determine the position of the UAV when the at least one image is captured. For instance, the position of the uncrewed aerial vehicle may be determined from at least one of a GPS unit of the UAV or a calculation of a distance to at least one reference point within the shared environment based upon the at least one image. To illustrate, the at least one reference point may comprise a reflector or a wireless beacon at a known geographic position. In one example, optional step 230 may include translation from GPS coordinates to coordinates in a local coordinate system for the shared environment (or vice versa). In addition, in one example, the shared environment may be defined by a series of geographic coordinates.

At step 240, the processing system determines a location of the window in the shared environment, based upon a position of the uncrewed aerial vehicle and a distance between the uncrewed aerial vehicle and at least a portion of the window that is calculated from the at least one image. As noted above, in one example, the at least one object detection model is trained to determine boundaries of windows within the images. As such, in one example, the determining of the location of the window further comprises determining locations of a plurality of points of a boundary of the window.

At step 250, the processing system records the location of the window in a map of the shared environment as a prohibited imaging zone. In an example, where the processing system comprises the UAV, the processing system may record the change in a map stored locally at the UAV. Alternatively, or in addition, the recording the location of the window in the map may comprise providing a set of coordinates defining the boundary of the window, e.g., to a security system and/or fleet management system that maintains the map of the shared environment. In one embodiment, any captured images are detected by the UAVs during or after the mapping operation is completed. In another example in which the processing system comprises a network-based processing system, step 250 may comprise obtaining the location of the window in the shared environment from the UAV. In this regard, it should be noted that each of the steps 210-230 may include instructing the UAV and/or obtaining intermediate results/data from the UAV, such as obtaining the at least one image, obtaining the position of the UAV, etc., and calculating the location of the window therefrom. The coordinates may be coordinates in a 3D space and can be coordinates in a world reference system (e.g., GPS coordinates including elevation), or can be coordinates in a local coordinate system for the shared environment.

Following step 250, the method 200 proceeds to step 295. At step 295, the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200, such as steps 210-250 to detect additional windows and to record additional prohibited imaging zones in the shared environment during a same or a different flight session. In one example, the method 200 may include obtaining an opt-out (e.g., withholding consent to allow the UAV to capture images at specific locations) from one or more of the entities of one or more properties, wherein the one or more properties are recorded as additional prohibited imaging zones. In still another example, the method 200 may include obtaining window(s) may be changed from prohibited imaging zones to allowed recording zones depending upon time of day, day of week, etc. Thus, these and other modifications are all contemplated within the scope of the present disclosure.

Figure 3:
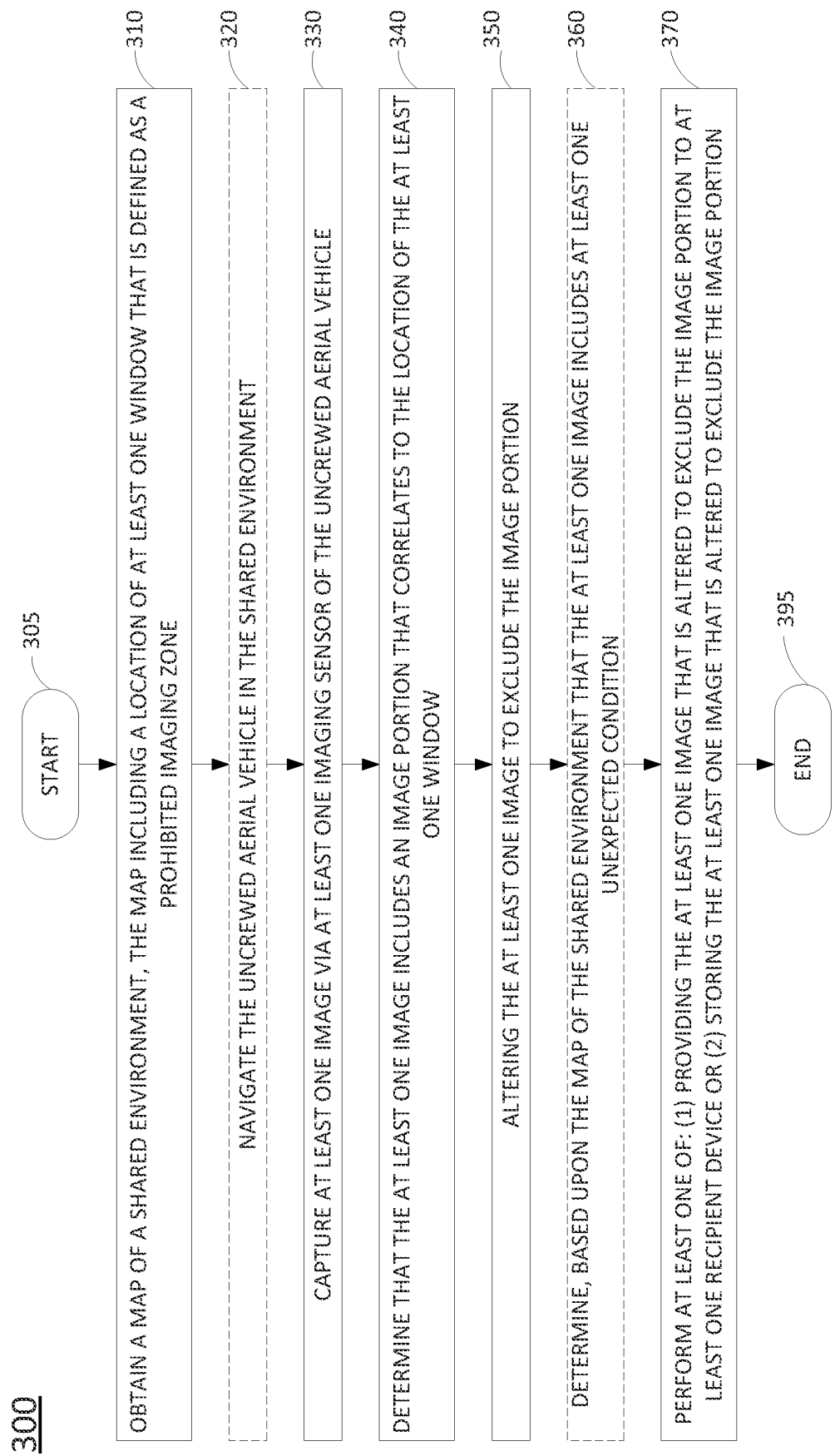
FIG. 3 illustrates a flowchart of an example method for determining by an uncrewed aerial vehicle based upon a map of a shared environment that at least one image includes an image portion that captures a location of at least one window and altering the at least one image to exclude the image portion.

FIG. 3 illustrates a flowchart of an example method 300 for determining by an uncrewed aerial vehicle based upon a map of a shared environment that at least one image includes an image portion that captures a location of at least one window and altering the at least one image to exclude the image portion. In one example, steps, functions and/or operations of the method 300 may be performed by an UAV, such as UAV 161 or UAV 160 or any one or more components thereof, or by UAV 161, and/or any one or more components thereof in conjunction with one or more other components of the system 100, such as server(s) 125, server(s) 112, elements of wireless access network 115, telecommunication network 110, one or more other UAVs (such as UAV 160), and so forth. In one example, the steps, functions, or operations of method 300 may be performed by a computing device or processing system, such as computing system 500 and/or hardware processor element 502 as described in connection with FIG. 5 below. For instance, the computing system 500 may represent any one or more components of the system 100 (e.g., UAV 161) that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 500 may collectively function as a processing system. For illustrative purposes, the method 300 is described in greater detail below in connection with an example performed by a processing system. The method 300 begins in step 305 and may proceed to step 310.

At step 310, the processing system (e.g., of an uncrewed aerial vehicle (UAV)) obtains a map of a shared environment, the map including a location of at least one window that is defined as a prohibited imaging zone.

At optional step 320, the processing system may navigate the UAV in the shared environment. For example, the processing system may navigate the UAV using the previously obtained map. In one example, the processing system may cause the UAV to fly a defined route in the shared environment, e.g., for security surveillance, or the like.

At step 330, the processing system captures at least one image via at least one imaging sensor of the UAV. For instance, the at least one imaging sensor may comprise at least one of an optical camera or a LiDAR unit. In one example, the at least one imaging sensor may also comprise an infrared camera, or the like.

At step 340, the processing system determines that the at least one image includes an image portion that correlates to the location of the at least one window. For instance, the prohibited imaging zone may be defined by a series of points of a boundary of the window. Thus, the processing system may determine if any of the boundary or the area within that is defined by the points is within the image. For example, the processing system may know the position of the UAV via a GPS unit or via ranging/sensing of reference points in the shared environment. In addition, the processing system may have awareness of the orientation, field-of-view, and range of the imaging sensor(s). As such, the processing system may calculate that the prohibited imaging zone is captured within the at least one image.

At step 350, the processing system alters the at least one image to exclude the image portion, e.g., the original content of the at least one image portion of the at least one image may be overwritten with blank data, pixelated or otherwise obscured, replaced with a different data content (e.g., a generic window, an image of the actual window previously obtained and stored, e.g., with consent of a property owner or other(s) with an interest in the property), etc.

At optional step 360, the processing system may determine, based upon the map of the shared environment that the at least one image includes at least one unexpected condition. For instance, the processing system of the UAV may have various detection models for detecting various objects or other conditions, which the processing system may apply on an ongoing basis to captured image sensor data to detect such things as any humans present, animals, vehicles, conditions such as fire, flooding, fighting, break-in, stalking, etc. Thus, for example, an unexpected condition may comprise a human presence outside of the prohibited imaging zone corresponding to the window (where the human is unknown to the processing system, or may comprise a known human whose presence is not authorized), a fire detected within the same image(s) that include the prohibited imaging zone, etc.

At step 370, the processing system performs at least one of: (1) providing the at least one image that is altered to exclude the image portion to at least one recipient device, or (2) storing the at least one image that is altered to exclude the image portion. The at least one recipient device may comprise, for example, an operator device that controls the UAV and/or a premises monitoring system, or monitoring station. In one example, the at least one recipient device may comprise a storage system from which stored images (including video and/or LiDAR images/renderings) may be retrieved and reviewed by humans or automated systems. In one example, the at least one recipient device may further comprise an artificial intelligence (AI) and/or machine learning (ML)-based system that further analyzes stored images. In an example where the unexpected condition is determined at optional step 360, the at least one image that is altered to exclude the image portion may further include a highlighting of the at least one unexpected condition (e.g., for forwarding to the at least one recipient device, where a human monitoring the at least one recipient device may have his or her attention further drawn to the detected unexpected condition).

Following step 370, the method 300 proceeds to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example, the processing system may repeat one or more steps of the method 300 for additional images relating to the same prohibited imaging zone, for different prohibited imaging zones, and so forth. In another example, the method 300 may include summoning another UAV or non-aerial AV to provide assistance in obtaining additional images relating an unexpected condition. In one example, steps 350 and 360 may comprise creating an altered version of the at least one image and then deleting an original copy of the image after storing the altered image or providing the altered image to the at least one recipient device. Thus, these and other modifications are all contemplated within the scope of the present disclosure.

Figure 4:
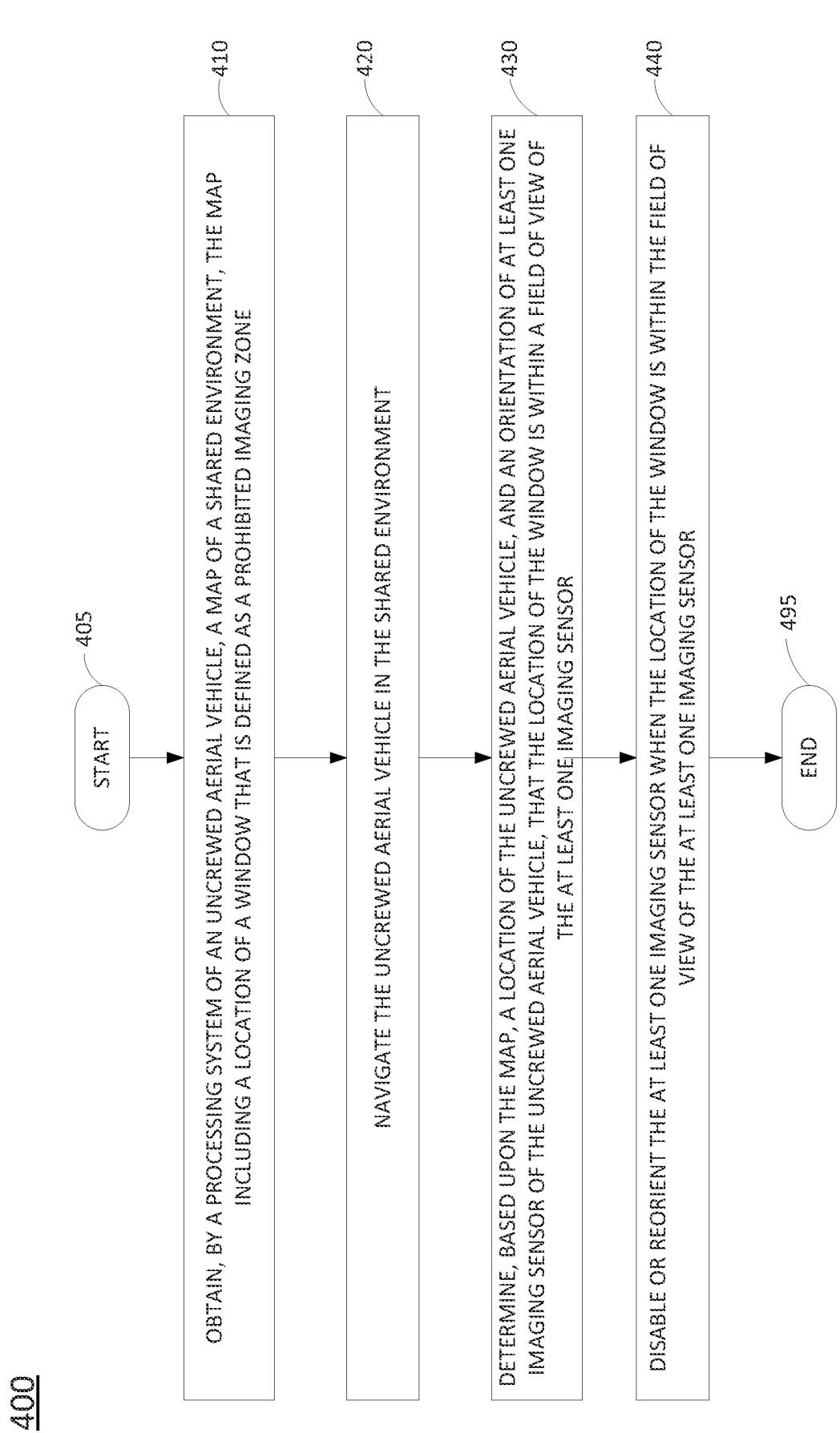
FIG. 4 illustrates a flowchart of an example method for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor.

FIG. 4 illustrates a flowchart of an example method 400 for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor. In one example, steps, functions and/or operations of the method 400 may be performed by a UAV, such as UAV 161 or UAV 160 or any one or more components thereof, or by UAV 161 or UAV 160, and/or any one or more components thereof in conjunction with one or more other components of the system 100, such as server(s) 125, server(s) 112, elements of wireless access network 115, telecommunication network 110, one or more other UAVs (such as UAV 160), and so forth. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 (e.g., UAV 161) that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and may proceed to step 410.

At step 410, the processing system (e.g., of an uncrewed aerial vehicle (UAV)) obtains a map of a shared environment, the map including a location of at least one window that is defined as a prohibited imaging zone. For instance, step 410 may comprise the same or similar operations as step 310 discussed above.

At step 420, the processing system may navigate the UAV in the shared environment. For example, the processing system may navigate the UAV using the previously obtained map. In one example, the processing system may cause the UAV to fly a defined route in the shared environment, e.g., for security surveillance, or the like. For instance, step 420 may comprise the same or similar operations as optional step 320 discussed above.

At step 430, the processing system determines based upon the map, a location of the UAV, and an orientation of at least one imaging sensor of the UAV, that the location of the window is within a field of view of the at least one imaging sensor. For instance, as discussed in the examples above, the processing system of the UAV may be aware of the field-of-view and ranges of onboard imaging sensors (e.g., optical camera(s), LiDAR unit(s), etc.) as well as the orientations of such imaging sensor(s). Combined with its own position information of the UAV, the processing system may determine when any points or prohibited imaging zones defined by a set of points are within such field-of-view.

At step 440, the processing system disables or reorients the at least one imaging sensor when the location of the window is within the field of view of the at least one imaging sensor.

Following step 440, the method 400 proceeds to step 495. At step 495, the method 400 ends.

It should be noted that the method 400 may be expanded to include additional steps, or may be modified to replace steps with different steps, to combine steps, to omit steps, to perform steps in a different order, and so forth. For instance, in one example, the processing system may repeat one or more steps of the method 400 for the same prohibited imaging zone, for different prohibited imaging zones, and so forth. In another example, prior to or in connection with step 430, the processing system may calculate the position of the UAV, e.g., in the same or a similar manner as discussed above in connection with optional step 230 of FIG. 2. In another example, the method 400 may include detecting that the prohibited imaging area is no longer within the field of view of the at least one imaging sensor, and re-activating or reorienting the at least one imaging sensor when it is detected that the prohibited imaging area is no longer within the field of view of the at least one imaging sensor. Thus, these and other modifications are all contemplated within the scope of the present disclosure.

In addition, although not expressly specified above, one or more steps of the method 200, the method 300, and/or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIGS. 2-4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components, devices, and/or systems illustrated in FIG. 1 or described in connection with FIGS. 2-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for determining via at least one imaging sensor of an uncrewed aerial vehicle a location of a window in a shared environment and recording the location of the window in a map of the shared environment as a prohibited imaging zone, for determining by an uncrewed aerial vehicle based upon a map of a shared environment that at least one image includes an image portion that captures a location of at least one window and altering the at least one image to exclude the image portion, or for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for determining via at least one imaging sensor of an uncrewed aerial vehicle a location of a window in a shared environment and recording the location of the window in a map of the shared environment as a prohibited imaging zone, for determining by an uncrewed aerial vehicle based upon a map of a shared environment that at least one image includes an image portion that captures a location of at least one window and altering the at least one image to exclude the image portion, or for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for determining via at least one imaging sensor of an uncrewed aerial vehicle a location of a window in a shared environment and recording the location of the window in a map of the shared environment as a prohibited imaging zone, for determining by an uncrewed aerial vehicle based upon a map of a shared environment that at least one image includes an image portion that captures a location of at least one window and altering the at least one image to exclude the image portion, or for disabling at least one imaging sensor of an uncrewed aerial vehicle when it is determined, based upon a map of a shared environment, a location of the uncrewed aerial vehicle, and an orientation of at least one imaging sensor of the uncrewed aerial vehicle, that a location of a window is within a field of view of the at least one imaging sensor (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   capturing, by a processing system including at least one processor, at least one image via at least one imaging sensor of an uncrewed aerial vehicle in a shared environment, wherein the shared environment comprises at least one of: a residential complex, an educational complex, or a business complex;
   detecting, by the processing system, a window within the at least one image;
   determining, by the processing system, a location of the window in the shared environment, based upon a position of the uncrewed aerial vehicle and a distance between the uncrewed aerial vehicle and at least a portion of the window that is calculated from the at least one image;
   recording, by the processing system, the location of the window in a map of the shared environment as a prohibited imaging zone; and
   providing, by the processing system, the map of the shared environment with the location of the window recorded as the prohibited imaging zone to at least one other uncrewed aerial vehicle that is deployed to perform tasks within the shared environment.

2. The method of claim 1, wherein the at least one imaging sensor comprises at least one of:
   an optical camera; or
   a light detection and ranging unit.

3. The method of claim 1, further comprising:
   determining the position of the uncrewed aerial vehicle when the at least one image is captured.

4. The method of claim 3, wherein the position of the uncrewed aerial vehicle is determined from at least one of:
   a global positioning system unit of the uncrewed aerial vehicle; or
   a calculation of a distance to at least one reference point within the shared environment based upon the at least one image.

5. The method of claim 1, wherein the window is identified by applying the at least one image as an input to at least one object detection model.

6. The method of claim 5, wherein the at least one object detection model is trained to detect one or more windows within an image.

7. The method of claim 6, wherein the at least one object detection model is further trained to determine boundaries of the one or more windows within the image.

8. The method of claim 1, wherein the determining the location of the window further comprises determining locations of a plurality of points of a boundary of the window.

9. The method of claim 8, wherein the recording the location of the window in the map comprises providing a set of coordinates defining the boundary of the window.

10. The method of claim 1, wherein a notification is provided to at least one entity associated with the shared environment of a scheduled time of the capturing of the at least one image.

11. A method comprising:
    obtaining, by a processing system of an uncrewed aerial vehicle, a map of a shared environment, the map including a location of at least one window that is defined as a prohibited imaging zone;
    capturing, by the processing system, at least one image via at least one imaging sensor of the uncrewed aerial vehicle;
    determining, by the processing system, that the at least one image includes an image portion that correlates to the location of the at least one window;
    determining, by the processing system based upon the map of the shared environment, that the at least one image includes at least one unexpected condition according to at least one detection model implemented by the processing system, wherein the at least one unexpected condition comprises at least one of: a change to a structure within the shared environment, a dangerous condition within the shared environment, or a presence of an unknown object within the shared environment;
    altering, by the processing system, the at least one image to exclude the image portion; and providing the at least one image that is altered to exclude the image portion to at least one recipient device, wherein the at least one image that is altered to exclude the image portion further includes a highlighting of the at least one unexpected condition.

12. The method of claim 11, wherein the at least one recipient device comprises an operator device that controls the uncrewed aerial vehicle.

13. The method of claim 11, wherein the at least one recipient device comprises a premises monitoring system.

14. The method of claim 11, wherein the altering the at least one image to exclude the image portion comprises overwriting an original content of the image portion of the at least one image.

15. The method of claim 11, wherein the uncrewed aerial vehicle comprises an autonomous aerial vehicle.

16. The method of claim 15, further comprising:
navigating the uncrewed aerial vehicle in the shared environment.

17. The method of claim 11, wherein the at least one unexpected condition is determined to be adjacent to the at least one window.

18. A method comprising:
obtaining, by a processing system of an uncrewed aerial vehicle, a map of a shared environment, the map including a location of a window that is defined as a prohibited imaging zone, wherein a plurality of uncrewed aerial vehicles including the uncrewed aerial vehicle is deployed to perform tasks within the shared environment, wherein the shared environment comprises at least one of: a residential complex, an educational complex, or a business complex;

navigating, by the processing system, the uncrewed aerial vehicle in the shared environment;

determining, by the processing system based upon the map, a location of the uncrewed aerial vehicle, and an orientation of at least one imaging sensor of the uncrewed aerial vehicle, that the location of the window is within a field of view of the at least one imaging sensor; and reorienting, by the processing system, the at least one imaging sensor when the location of the window is within the field of view of the at least one imaging sensor.

19. The method of claim 18, wherein the at least one imaging sensor comprises at least one of:
an optical camera; or
a light detection and ranging unit.

20. The method of claim 18, wherein the uncrewed aerial vehicle comprises an autonomous aerial vehicle.

* * * * *